US012631058B2

(12) United States Patent
Akanou et al.

(10) Patent No.: US 12,631,058 B2
(45) Date of Patent: May 19, 2026

(54) ELECTRONIC SENSING UNIT FOR A HANDLE ATTACHED ON A CAR DOOR

(71) Applicant: MINEBEA ACCESSSOLUTIONS ITALIA S.P.A., Pianezza (IT)

(72) Inventors: Myriam Akanou, Pianezza (IT); Anthony Guerin, Pianezza (IT); Antonio Labalestra, Pianezza (IT)

(73) Assignee: MINEBEA ACCESSSOLUTIONS ITALIA S.P.A., Pianezza (IT)

( * ) Notice: Subject to any disclaimer, the term of this patent is extended or adjusted under 35 U.S.C. 154(b) by 164 days.

(21) Appl. No.: 18/461,158

(22) Filed: Sep. 5, 2023

(65) Prior Publication Data

US 2024/0076913 A1 Mar. 7, 2024

(30) Foreign Application Priority Data

Sep. 6, 2022 (EP) .................................... 22194179

(51) Int. Cl.
*E05B 81/76* (2014.01)
*E05B 79/06* (2014.01)

(52) U.S. Cl.
CPC .............. *E05B 81/77* (2013.01); *E05B 79/06* (2013.01)

(58) Field of Classification Search
CPC .......... E05B 81/76; E05B 81/77; E05B 79/06; E05B 85/10
See application file for complete search history.

(56) References Cited

U.S. PATENT DOCUMENTS 7,210,715 B2 * 5/2007 Kobayashi .............. E05B 81/76 70/237
7,504,601 B2 * 3/2009 Belmond ............... G01D 21/02 200/61.62
7,598,469 B2 * 10/2009 Tanimoto ................ B60R 25/00 200/341
8,248,205 B2 * 8/2012 Schindler ................ E05B 81/78 292/336.3
2002/0005016 A1 * 1/2002 Menke .................... E05B 81/76 49/503

(Continued)

FOREIGN PATENT DOCUMENTS

DE 102016123724 A1 6/2018
WO WO-2017019760 A1 * 2/2017

OTHER PUBLICATIONS

European Search Report issued in corresponding EP Application 22194179, dated Feb. 3, 2023, 3 pages.

(Continued)

*Primary Examiner* — Kristina R Fulton
*Assistant Examiner* — Noah Horowitz
(74) *Attorney, Agent, or Firm* — Burris Law, PLLC

(57) ABSTRACT

An electronic sensing unit for a handle attached on a car door includes a sensor and a fixing mechanism. The sensor is attached on an external side of a part of the car door extending according to a reference plane. The fixing mechanism includes a first element and a second element configured to cooperate together. The first element is configured to cooperate with the part of the car door and the sensor. The second element is configured to cooperate with the handle so that a constraint applied to the handle is transmitted to the sensor for detection of a command.

10 Claims, 2 Drawing Sheets

(56) References Cited

U.S. PATENT DOCUMENTS

| | | | | |
|---|---|---|---|---|
| 2003/0029210 | A1* | 2/2003 | Budzynski | E05B 85/10 70/264 |
| 2007/0227203 | A1* | 10/2007 | Weber | H03K 17/964 70/91 |
| 2010/0134307 | A1* | 6/2010 | Witte | E05B 81/78 340/665 |
| 2014/0292004 | A1 | 10/2014 | Ruse | |
| 2015/0123409 | A1 | 5/2015 | Lange et al. | |
| 2016/0123045 | A1* | 5/2016 | Bingle | E05B 81/04 292/336.3 |
| 2016/0251880 | A1* | 9/2016 | Bingle | E05B 81/76 701/49 |
| 2024/0376756 | A1* | 11/2024 | Guerin | G01L 1/005 |

OTHER PUBLICATIONS

European Search Report and Written Opinion issued in corresponding EP Application 22214669.8, issued Aug. 9, 2023, 10 pages.

* cited by examiner

ELECTRONIC SENSING UNIT FOR A HANDLE ATTACHED ON A CAR DOOR

CROSS-REFERENCE TO RELATED APPLICATIONS

This claims priority to and the benefit of EP 22194179.2 filed on Sep. 6, 2022. The disclosures of the above application are incorporated herein by reference.

FIELD

The present disclosure relates to an electronic sensing unit for a handle attached on a car door.

BACKGROUND

The statements in this section merely provide background information related to the present disclosure and may not constitute prior art.

It is known to have a car door with a closing system that can be released with a mechanical arrangement built in a handle of the car. Typically, the user seizes the mechanical arrangement located on the handle to trigger it. The user can then, in a same move, pull the door to open it.

This provision gives satisfaction in that the user is intuitively guided to operate the door because the mechanical arrangement reacts when gripping the handle.

It is also known to use electronic detectors in the automotive industry to facilitate the user command by limiting the force that should be applied to execute a task. Here, it is also known to add a sensing unit to a car door to unlock it for opening.

The use of a sensing unit can however result in a decrease of the user experience quality since the sensing unit could be located in a place that is not intuitive for the user.

The implementation of a sensing unit in a handle could also lead to another opening method that requires practice for the user. For example, it could be necessary to push or touch a button and then pull the door which implies realizing two different movements in a precise order to open the door.

Therefore, there is a need for a better integration of the electronic sensing unit in a handle to facilitate the handling by the user.

The present disclosure aims to solve all or some of the disadvantages mentioned above.

SUMMARY

This section provides a general summary of the disclosure and is not a comprehensive disclosure of its full scope or all of its features.

For this purpose, the present disclosure relates to an electronic sensing unit for a handle attached on a car door, the electronic sensing unit includes:

- a sensor attached on an external side of a part of the car door extending according to a reference plane,
- a fixing mechanism for the sensor, the fixing mechanism including a first element and a second element configured to cooperate together; the first element being also configured to cooperate with the part of the car door and the sensor; the second element being also configured to cooperate with the handle so that a constraint applied to the handle is transmitted to the sensor for detection of a command.

This provision permits the ability to have a sensor that is fixed on the external side of the car and in the same time that is biased by a constraint applied to the handle. Given that the sensor cooperates simultaneously with the part of the car door and with the handle, the sensor can measure a constraint and therefore a command from a user pushing or pulling the handle.

According to an aspect of the disclosure, the external side refers to the side of the part of the car door facing the outside of the car. In one form, the part may optionally include an internal side facing the interior of the car.

According to an aspect of the disclosure, the handle is an outside handle of the car for example on the driver side. The term "car" as used herein is understood to include every kind of vehicle in the automotive industry including bus, truck, personal vehicles etc.

According to an aspect of the disclosure, the sensor includes at least one strain gauge, the at least one strain gauge being configured to be deformed when the constraint is applied to the handle.

The second element of the fixing mechanism permits the ability to transmit the constraint applied on the handle so as to deform the at least one strain gauge. Thus, when a user pushes or pulls the handle of the car, it implies the deformation of the at least one strain gauge.

According to an aspect of the disclosure, the at least one sensor is configured to close and to release a locking mechanism of the car door.

In one form, when a compressing pressure is applied to the sensor transversally to the reference plane, namely when pushing the car door towards a closed position, a locking command is acquired.

In one form, when an extending pressure is applied to the sensor transversally to the reference plane, namely when pulling the car door towards an open position, a releasing command is acquired.

In other words, in only one movement, the user can unlock and open the car door or close and lock the car door.

According to an aspect of the disclosure, the at least one strain gauge may be a full-bridge strain gauge or a half-bridge strain gauge.

According to an aspect of the disclosure, the handle is an outside handle of the car for example on the driver side. The term "car" as used herein is understood to include every kind of vehicle in the automotive industry including bus, truck, personal vehicles etc.

According to an aspect of the disclosure, the sensor includes a support on which the at least one strain gauge is attached, the support being configured to be attached on the external side or on an intermediate part mounted on the external side, the support extending parallel to the reference plane.

The fact that the support is substantially planar and extends parallel to the reference plane facilitates the insertion of the sensor between the handle and the external side.

According to an aspect of the disclosure, each sensor includes two strain gauges mounted on the support. In one form, the support may optionally be constituted of a metal material.

According to an aspect of the disclosure, the at least one attaching portion is configured to be fixed to the part of the car via a corresponding third element of the fixing mechanism.

According to an aspect of the disclosure, the at least one attaching portion is an orifice or a slot configured for receiving the corresponding third element which is for example a screw, and in one form may optionally be with mounting ring(s).

In one form, the support presents two attaching portions, the strain gauges being located between the two attaching portions according to a longitudinal direction of the support.

According to an aspect of the disclosure, the first element extends according to a main direction that is configured to be transversal to the reference plane when installed, the part of the car door and the support presenting each a through opening for the passage of the first element.

Both openings are aligned so that the first element is able to pass though. According to an aspect of the disclosure, the first element includes a head configured to cooperate with an internal surface of the part of the car door opposed to the external side.

According to an aspect of the disclosure, the opening of the support is located between the two strain gauges according to the longitudinal direction of the support.

According to an aspect of the disclosure, the first element is a screw.

A screw is an efficient way to secure the support on the external side or on an intermediate part mounted on the external side.

According to an aspect of the disclosure, the second element presents a form complementary with a recess in the handle so that there is cooperation by complementarity of form.

The complementarity of form is important as it permits the first element to move together with the handle when a user is pushing or pulling the handle.

According to an aspect of the disclosure, the second element is a nut.

According to an aspect of the disclosure, the nut is configured to cooperate with the screw to secure the support on the external side.

According to an aspect of the disclosure, the electronic sensing unit includes two distinct sensors and two corresponding fixing mechanisms.

This provision permits the ability to obtain a more accurate signal.

The present disclosure also concerns a car access assembly including the handle mounted on the car door, the car access assembly also including an electronic sensing unit as described above.

In one form, the car access assembly also includes the car door. The present disclosure also concerns a car including at least one car access assembly as described above.

According to an aspect of the disclosure, the car access assembly includes an additional fixing element for fixing the handle on the part of the car. In one form, the additional fixing element is a screw configured to be cooperating with the handle and with the part of the car, the screw presenting an axis deviating from the main direction transversally to the reference plane. In particular, the deviation is 45°±10° or 90°±10°.

According to an aspect of the disclosure, the handle includes a guiding leg extending farther than the internal face of the part of the car door, the guiding leg being configured for guiding a signal transmitting device of the electronic sensing unit connected the sensor.

The guiding leg serves to protect the signal transmitting device connected to the sensor. According to an aspect of the disclosure, the part of the car presents a notch for the passage of the guiding leg from the external side to a location farther than the internal surface of the part of the car.

According to an aspect of the disclosure, the guiding leg presents channel(s) for the signal transmitting device guiding.

According to an aspect of the disclosure, the signal transmitting device includes electrical wire(s) or flexible printed circuit board(s) configured to transmit a signal from the sensor.

In one form, the wires can be shielded. In another form, the wires can be unshielded.

According to an aspect of the disclosure, the car access system also includes an electronic control unit, the electronic control unit including a connector configured to cooperate with the signal transmitting device, the guiding leg presenting a housing for receiving the electronic control unit.

According to an aspect of the disclosure, the electronic control unit includes a rigid printed circuit box configured to track the measures from the sensor. In one form, the electronic control unit may optionally include an outlet cable to be connected to the car information management system.

Alternatively, the electronic control unit can include an outlet connector, for example accessible from the outside the housing of electronic control unit.

The electronic control unit may include a housing realized by potting for protecting the inner components. The outlet connector can be outside of the potting.

The different aspects defined above that are not incompatible can be combined.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
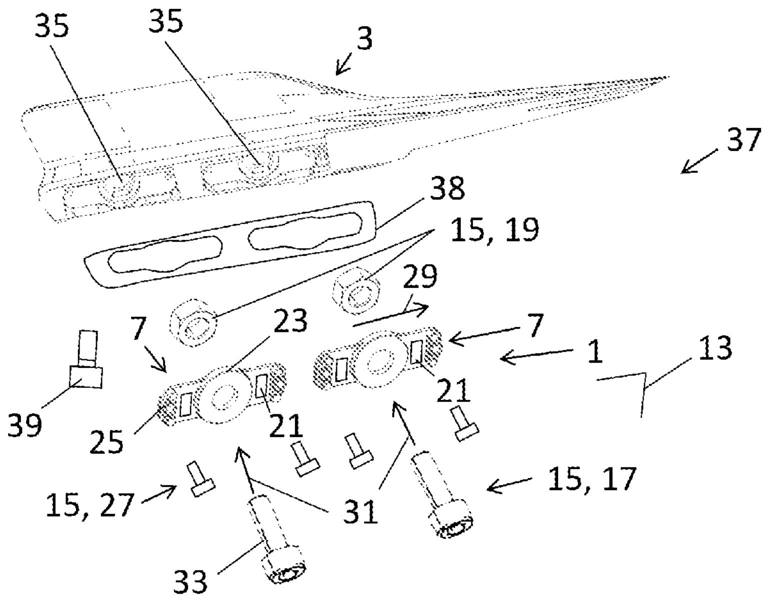
FIG. 1 is a perspective exploded view of a handle and an electronic sensing unit according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description of the figures defined above, the same elements or the elements that are fulfilling identical functions may retain the same references so as to simplify the understanding of the disclosure.

Figure 2:
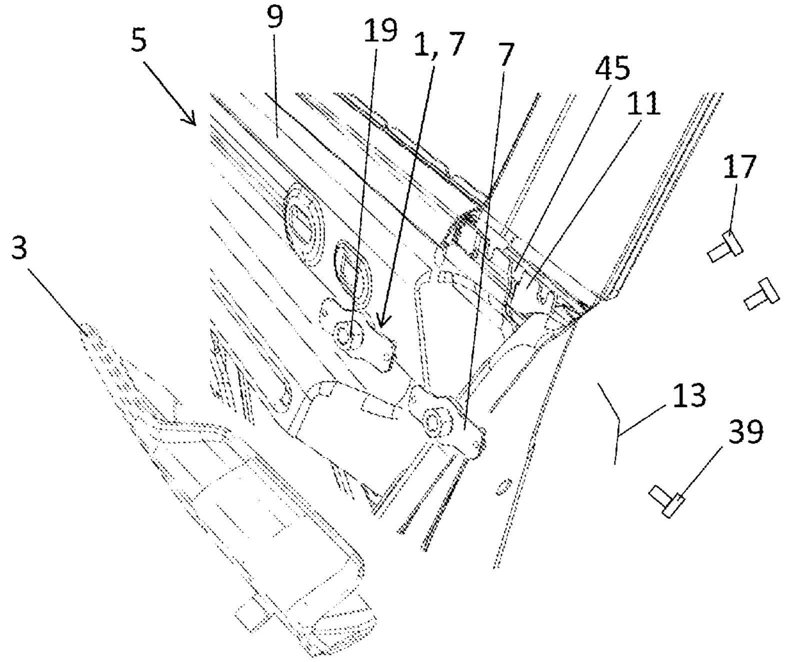
FIG. 2 is a perspective view of a car door with the handle and the electronic sensing unit of FIG. 1 according to the present disclosure.

As illustrated in FIGS. 1 and 2, an electronic sensing unit 1 for a handle 3 attached on a car door 5 is depicted.

The electronic sensing unit 1 includes two sensors 7 attached on an external side 9 of a part 11 of the car door 5 extending according to a reference plane 13.

The electronic sensing unit 1 includes a fixing mechanism 15 for each sensor 7, the fixing mechanism 15 including a first element 17 and a second element 19 configured to cooperate together; the first element 17 being also configured to cooperate with the part 11 of the car door 5 and the sensor 7.

The second element 19 is configured to cooperate with the handle 3 so that a constraint applied to the handle 3 is transmitted to the sensors 7 for detection of a command.

The external side 9 refers to the side of the part 11 of the car door 5 facing the outside of the car. The part 11 includes an internal side facing the interior of the car.

The handle 3 is an outside handle of the car for example on the driver side. As used herein, the term "car" is understood to include every kind of vehicle in the automotive industry including bus, truck, personal vehicles etc.

Each sensor 7 includes at least one strain gauge 21, the at least one strain gauge 21 being configured to be deformed when the constraint is applied to the handle 3.

The second element 19 of the fixing mechanism 15 permits the ability to transmit the constraint applied on the handle so as to deform the at least one strain gauge 21. Thus, when a user push or pulls the handle 3 of the car, it implies the deformation of the at least one strain gauge 21.

Each sensor 7 is configured to close and to release a locking mechanism of the car door 5.

When a compressing pressure is applied to the sensors 7 transversally to the reference plane 13, namely when pushing the car door 5 towards a closed position, a locking command is acquired.

When an extending pressure is applied to the sensor transversally to the reference plane 13, namely when pulling the car door towards an open position, a releasing command is acquired.

In other words, in only one movement, the user can unlock and open the car door 5 or close and lock the car door 5.

The at least one strain gauge 21 may be a full-bridge strain gauge or a half-bridge strain gauge.

The handle 3 is an outside handle of the car for example on the driver side. The term "car" as used herein is understood to include every kind of vehicle in the automotive industry including bus, truck, personal vehicles etc.

Each sensor 7 includes a support 23 on which the at least one strain gauge 21 is attached, the support 23 being configured to be attached on the external side 9 or on an intermediate part mounted on the external side 9, the support 23 extending parallel to the reference plane 13.

The fact that the support 23 is substantially planar and extending parallel to the reference plane 13 facilitates the insertion of the sensors 7 between the handle 3 and the external side 9.

Each sensor 7 includes two strain gauges 21 mounted on the support 23. In one form, the support 23 is constituted of a metal material.

The support 23 presents at least one attaching portion 25 configured to be fixed to the part 11 of the car thanks to a corresponding third element 27 of the fixing mechanism 15.

The at least one attaching portion 25 is an orifice or a slot configured for receiving the corresponding third element 27 which is for example a screw, and may optionally be with mounting ring(s).

Here, the support 23 presents two attaching portions 25, the strain gauges 21 being located between the two attaching portions 25 according to a longitudinal direction 29 of the support 23.

Each first element 17 extends according to a main direction 31 that is configured to be transversal to the reference plane 13 when installed, the part 11 of the car door 5 and the support 23 presenting each a through opening for the passage of the first element 17.

Both openings are aligned so that the first element 17 is able to pass though. The first element 17 includes a head 33 configured to cooperate with the internal surface of the part 11 of the car door 5 opposed to the external side 9.

The opening of the support 23 is located between the two strain gauges 21 according to the longitudinal direction 29 of the support 23. In the example provided, the first element 17 is a screw.

A screw is an efficient way to secure the support 23 on the external side 9 or on an intermediate part mounted on the external side 9.

The second element 19 presents a form complementary with a recess 35 in the handle 3 so that there is a cooperation by complementarity of form. The complementarity of form is important as it permits the first element 17 to move together with the handle 3 when a user is pushing or pulling the handle 3.

In the example provided, the second element 19 is a nut, the nut being configured to cooperate with the screw to secure the support 23 on the external side 9.

As illustrated in the figures, the electronic sensing unit 1 includes two distinct sensors 7 and two corresponding fixing mechanisms 15.

A car access assembly 37 includes the handle 3 mounted on the car door 5, the car access assembly 37 also including an electronic sensing unit 1 described above. The handle can include a gasket 38 to be inserted between the handle 3 and the external side 9.

The car access assembly 37 also includes the car door 5. There is also a car including at least one car access assembly 37 as described above.

The car access assembly includes an additional fixing element 39 for fixing the handle 3 on the part 11 of the car. In one form, the additional fixing element 39 may optionally be a screw configured to cooperate with the handle 3 and with the part 11 of the car, the screw presenting an axis deviating from the main direction 31 transversally to the reference plane 13.

In particular, the deviation is 45°±10° as in FIG. 1 or 90°±10° as in FIG. 2.

Figure 3:
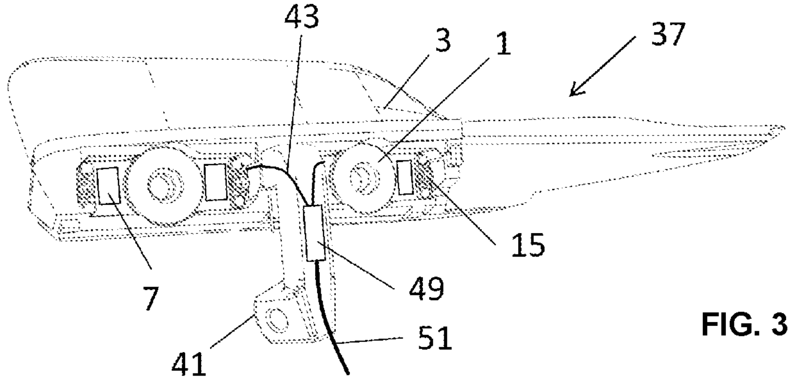
FIG. 3 is a perspective view of the electronic sensing unit and the handle of FIG. 2 with a guiding leg according to a first form of the present disclosure.
Figure 4:
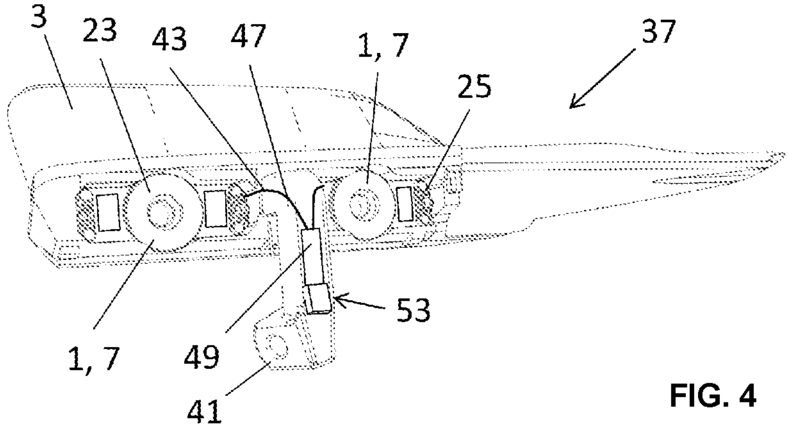
FIG. 4 is a perspective view of the electronic sensing unit and the handle of FIG. 2 with a guiding leg according to a second form of the present disclosure.
Figure 5:
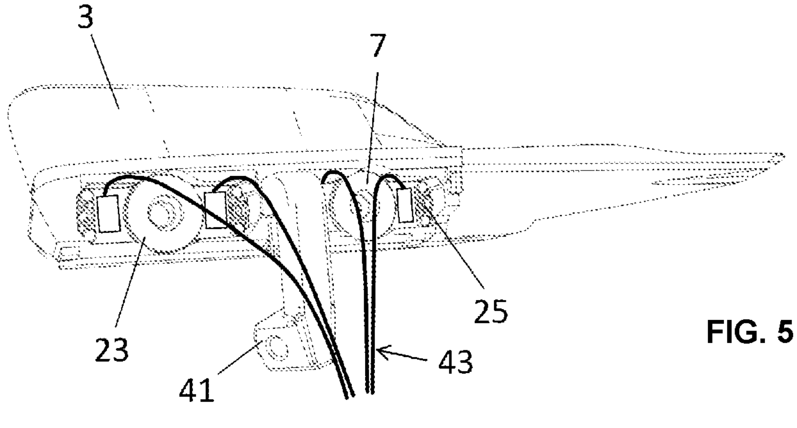
FIG. 5 is a perspective view of the electronic sensing unit and the handle of FIG. 2 with a guiding leg according to a third form of the present disclosure.

As illustrated on FIGS. 3 to 5, the handle 3 includes a guiding leg 41 extending farther than the internal face of the part 11 of the car, the guiding leg 41 being configured for guiding a signal transmitting device 43 connected the sensors 7.

The guiding leg 41 serves to protect the signal transmitting device 43 connected to the sensors 7. The part 11 of the car presents a notch 45 in FIG. 2 for the passage of the guiding leg 41 from the external side 9 to a location farther than the internal surface of the part 11 of the car.

The guiding leg 41 presents channels 47 for the signal transmitting device 43 guiding.

The signal transmitting device 43 includes electrical wires in the form of FIG. 5 or flexible printed circuit boards configured to transmit a signal from the sensors 7 as in FIGS. 3 and 4. The wires can be shielded or unshielded.

The car access system 1 may also includes an electronic control unit 49 as in FIGS. 3 and 4, the electronic control unit 49 including a connector configured to cooperate with the signal transmitting device 43, the guiding leg 41 presenting a housing for receiving the electronic control unit 49.

The electronic control unit 49 includes a rigid printed circuit box configured to track the measures from the sensors 7. The electronic control unit 49 may include an outlet cable 51 as in FIG. 3 to be connected to the car information management system.

Alternatively, the electronic control unit 49 can include an outlet connector 53 as in FIG. 4, which is accessible from the outside of the housing of electronic control unit 49.

The electronic control unit 49 may include a housing realized by potting for protecting the inner components. The outlet connector 53 can be outside of the potting.

the teachings of the present disclosure are not limited to the sole forms described above by way of example, and encompasses all possible the variants.

Unless otherwise expressly indicated herein, all numerical values indicating mechanical/thermal properties, compositional percentages, dimensions and/or tolerances, or other characteristics are to be understood as modified by the word “about” or “approximately” in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean “at least one of A, at least one of B, and at least one of C.”

In this application, the term “controller” and/or “module” may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electronic sensing unit for a handle attached on a car door, the electronic sensing unit comprising:

a sensor attached on an external side of a part of the car door extending substantially parallel to a reference plane, and a fixing mechanism for the sensor, the fixing mechanism comprising a first element and a second element configured to cooperate together, wherein the first element is also configured to cooperate with the part of the car door and the sensor, wherein the second element is also configured to cooperate with the handle so that a constraint applied to the handle is transmitted to the sensor for detection of a command, wherein the sensor includes at least one strain gauge, the at least one strain gauge being configured to be deformed when the constraint is applied to the handle, wherein the sensor comprises a support on which the at least one strain gauge is attached, the support being configured to be attached on the external side of the part of the car door or on an intermediate part mounted on the external side of the part of the car door, the support extending parallel to the reference plane, wherein the support has two attaching portions each being configured to be fixed to the part of the car thanks to a corresponding third element of the fixing mechanism, wherein the at least one strain gauge being located between the two attaching portions along a longitudinal direction of the support.

2. The electronic sensing unit according to claim 1, wherein the first element extends according to a main direction that is configured to be transversal to the reference plane when installed, the part of the car door and the support presenting each a through opening configured to permit passage of the first element therethrough.

3. The electronic sensing unit according to claim 2, wherein the first element is a screw.

4. The electronic sensing unit according to claim 1, wherein the second element presents a form complementary with a recess in the handle so that there is a cooperation by complementarity of form.

5. The electronic sensing unit according to claim 4, wherein the second element is a nut.

6. The electronic sensing unit according to claim 1, comprising two distinct sensors and two corresponding fixing mechanisms.

7. A car access assembly comprising:

the handle mounted on the car door; and the electronic sensing unit according to claim 1.

8. The car access assembly according to claim 7, wherein the handle comprises a guiding leg extending farther than an internal face of the part of the car door, the guiding leg being configured for guiding a signal transmitting device of the electronic sensing unit connected the sensor.

9. The car access assembly according to claim 8, wherein the signal transmitting device comprises at least one electrical wire or at least one flexible printed circuit board configured to transmit a signal from the sensor.

10. The car access assembly according to claim 8, further comprising an electronic control unit, said electronic control unit comprising a connector configured to cooperate with the signal transmitting device, the guiding leg presenting a housing for receiving said electronic control unit.

* * * * *